(12) United States Patent
Fan et al.

(10) Patent No.: US 7,898,797 B2
(45) Date of Patent: Mar. 1, 2011

(54) MOUNTING APPARATUS FOR PERIPHERAL COMPONENT INTERCONNECT CARD

(75) Inventors: Chen-Lu Fan, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 83 days.

(21) Appl. No.: 12/494,571

(22) Filed: Jun. 30, 2009

(65) Prior Publication Data

US 2010/0271768 A1 Oct. 28, 2010

(51) Int. Cl.
*G06F 1/16* (2006.01)

(52) U.S. Cl. ............... 361/679.4; 455/550.1; 353/122; 360/245.1

(58) Field of Classification Search .......... 455/566, 455/550.1, 90.1; 235/441, 492; 353/15, 353/122; 267/140.14; 369/44.14; 360/245.1, 360/97.01, 97.02, 94; 361/759, 679.08, 679.13, 361/679.14, 679.55, 679.4, 679.58, 679.32, 361/679.31, 679.48

See application file for complete search history.

(56) References Cited

U.S. PATENT DOCUMENTS

| | | | | |
|---|---|---|---|---|
| 7,724,538 | B2 * | 5/2010 | Tsai et al. | 361/802 |
| 2009/0154119 | A1 * | 6/2009 | Chen et al. | 361/759 |
| 2009/0262508 | A1 * | 10/2009 | Fukui et al. | 361/759 |

* cited by examiner

*Primary Examiner*—Hung V Duong
(74) *Attorney, Agent, or Firm*—D. Austin Bonderer

(57) ABSTRACT

A mounting apparatus for PCI card, includes a mounting bracket, a securing piece adapted to attach the PCI card to the mounting bracket, and an elastic securing member pivotally mounted on the blocking plate of the mounting bracket. The mounting bracket has a base and a blocking plate perpendicular to the base. An opening is defined in the mounting bracket adjacent to the blocking plate. The securing piece includes a first end and a second end perpendicular to the first end. The first end abuts and engages with the mounting bracket base, and the second end abut the blocking plate of the mounting bracket. The elastic securing member includes a pressing portion and an actuating portion. The actuating portion is resiliently received in the opening to force the pressing portion to sandwich the second end of the securing piece between the blocking plate and the pressing portion.

18 Claims, 6 Drawing Sheets

MOUNTING APPARATUS FOR PERIPHERAL COMPONENT INTERCONNECT CARD

BACKGROUND

1. Technical Field

The present disclosure relates to mounting apparatuses, and particularly, to a mounting apparatus for a peripheral component interconnect (PCI) card.

2. Description of Related Art

PCI cards are widely used in computers. PCI is a kind of bus structure, which is used for connecting to modem cards, monitor cards, sound cards or other peripheral equipment. The conventional fixing manner for PCI cards usually involves screws. Such a manner not only requires screws but also a screwdriver, which is time-consuming and troublesome. Moreover, the screws are easily lost. If a screw falls on the printed circuit board (PCB), damage to the PCB may occur, especially when the computer is powered up. Furthermore, more and more components are needed to be installed in the computer. The space in the computer enclosure will be occupied by a mass of electronic components so that not enough space for operating a screwdriver will exist.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
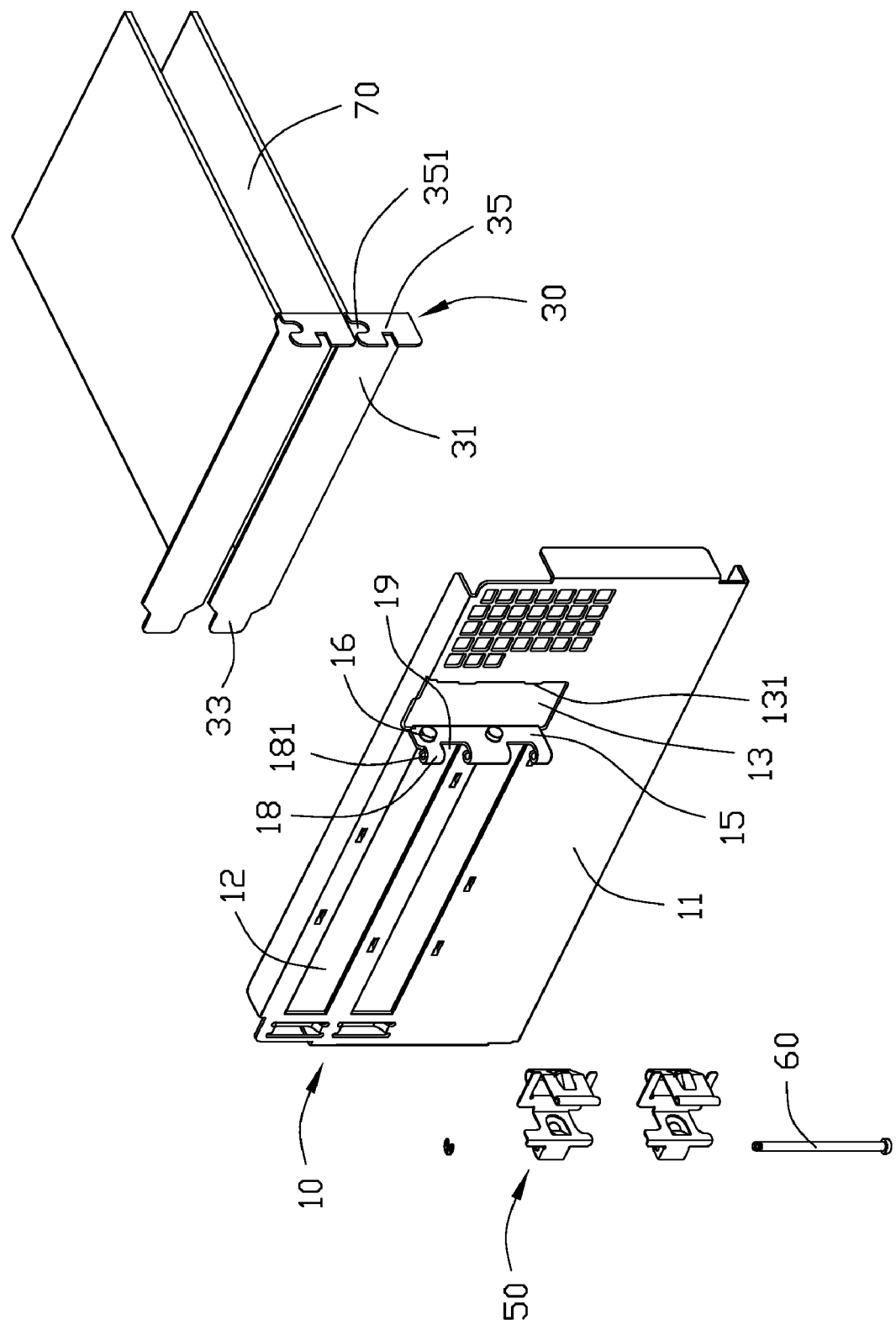
FIG. 1 is an exploded, isometric view of an embodiment of a mounting apparatus for PCI cards.

Referring to FIG. 1, an embodiment of a mounting apparatus for one or more PCI cards 70. In the shown embodiment, two PCI cards 70 are used. The mounting apparatus includes a mounting bracket 10, two securing pieces 30 configured for attaching the two PCI cards 70 to the mounting bracket 10, and two elastic securing members 50 pivotally mounted to the mounting bracket 10.

Figure 2:
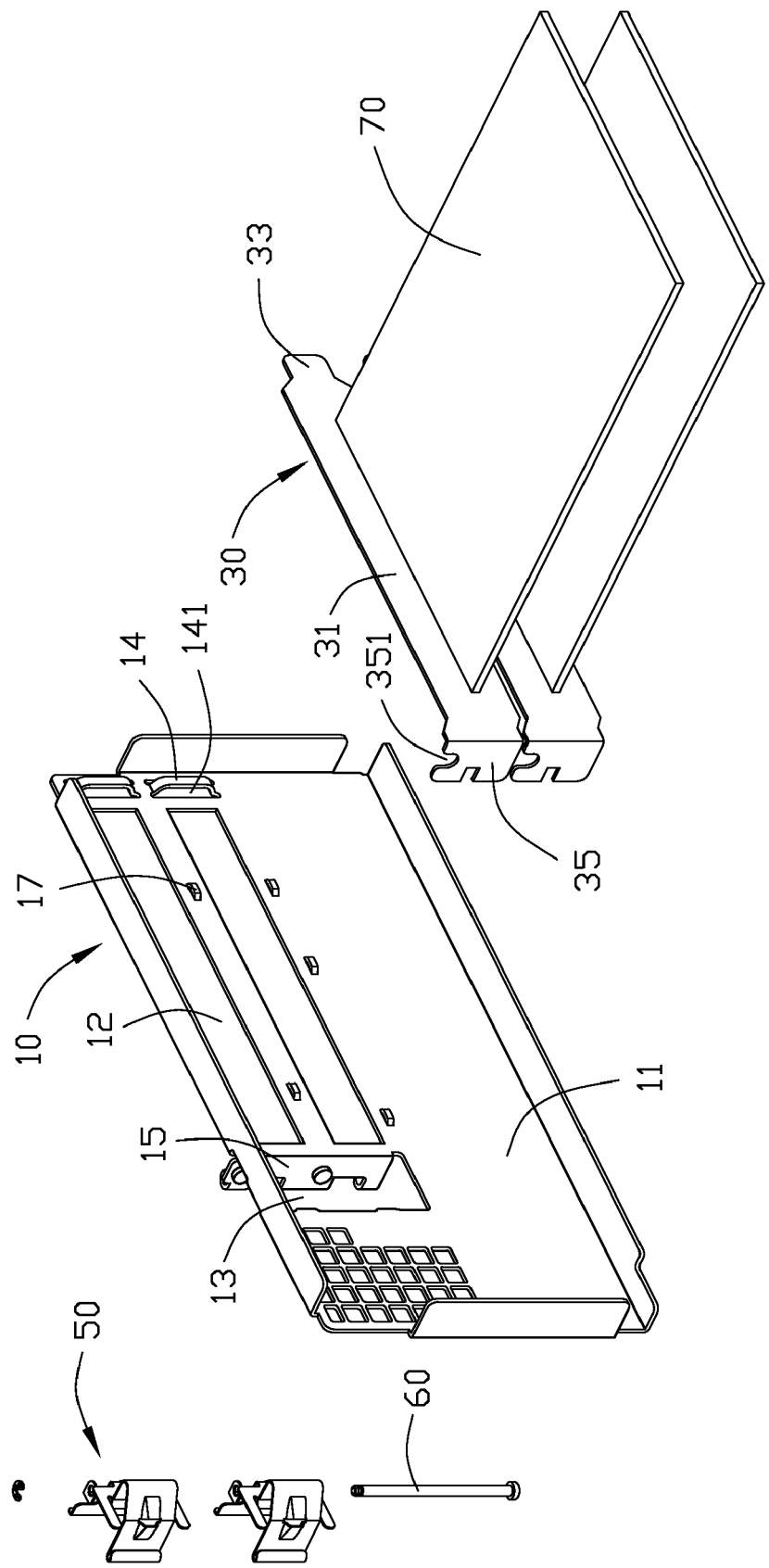
FIG. 2 is similar to FIG. 1, but viewed from another aspect.
Figure 3:
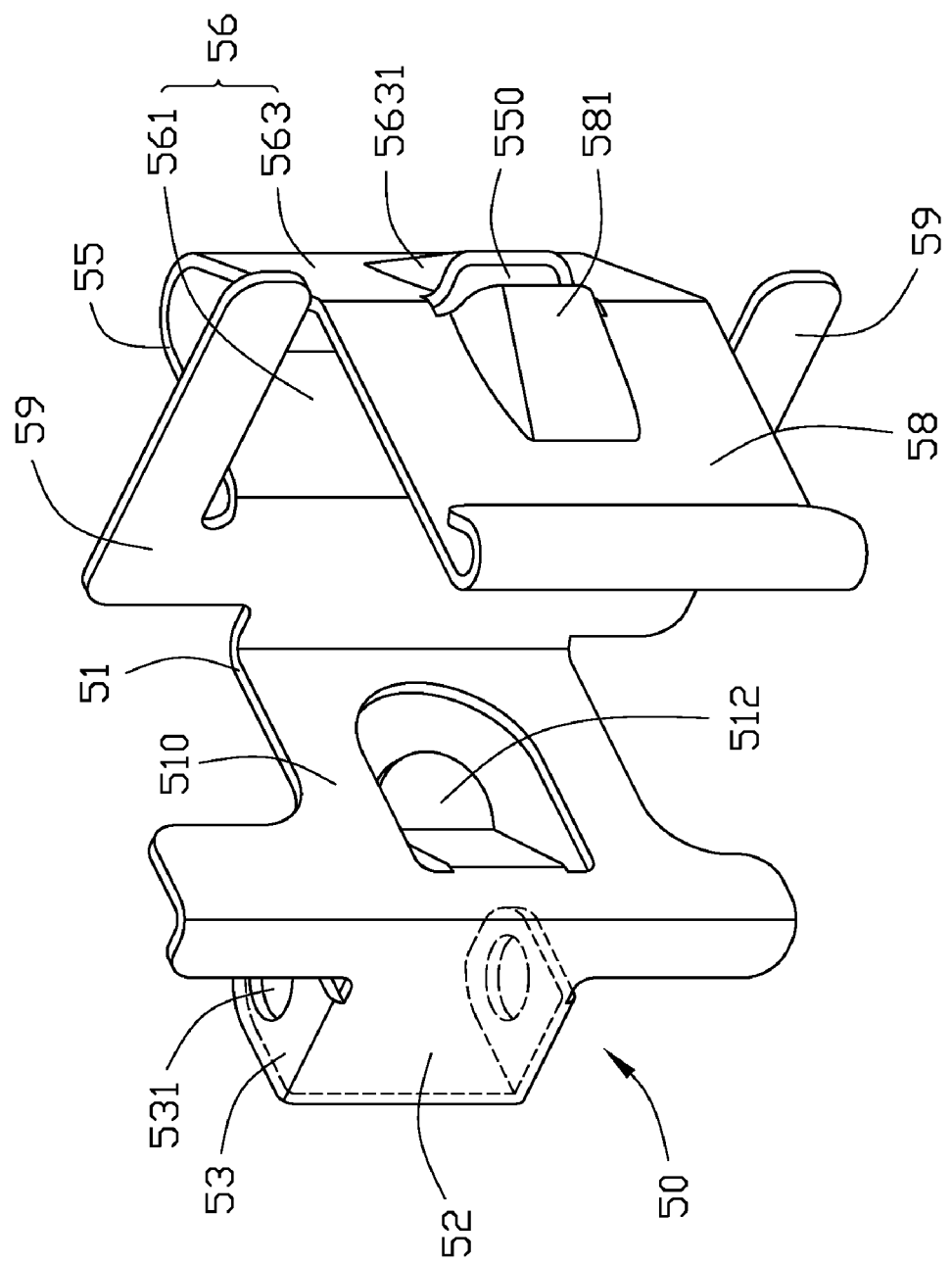
FIG. 3 is an enlarged isometric view of one of the elastic securing members in FIG. 1.

Referring also to FIGS. 2 and 3, the mounting bracket includes a rectangular base 11. Two elongated rectangular slots 12 are defined in the base 11. Two bridge portions 14 are formed on the base 11 adjacent one side of the elongated rectangular slots 12. Each bridge portion defines a securing slot 141. A mounting opening 13 is defined in the base 11 adjacent the elongated rectangular slots 12. A blocking plate 15, perpendicular to the base 11, extends from the mounting opening 13 side edge adjacent the elongated rectangular slots 12. Two protrusions 16 protrude from the blocking plate 15. A plurality of pivot portions 18 is formed at a side of the blocking plate 15. Each pivot portion 18 defines a pivot hole 181. A receiving notch 19 is defined between every two adjacent pivot portions 18. Two blocking tabs 131 protrude from another mounting opening 13 side edge opposite to the bent plate 15.

Each of the securing pieces 30 includes an elongated rectangular base 31 configured to covering the corresponding elongated rectangular slot 12. A first end 33 extends from one side of the elongated rectangular base 31, and a second end 35. A cutout 351 is defined at an edge of the second end 35.

Referring to FIG. 3, each of the elastic securing members 50 includes a pressing portion 51 and an actuating portion 55 connected to the pressing portion 51. The pressing portion 51 includes a pressing plate 510, and an elastic tab 512 protruding out from the pressing plate 510. A supporting wall 52 perpendicularly extends from one side edge of the pressing plate 510. Two pivot tabs 53, perpendicular to the pressing plate 510 and the supporting wall 52, are bent from two opposite sides of the supporting wall 52. Each pivot tab 53 defines a pivot hole 531 corresponding to the pivot portion pivot holes 181. The actuating portion 55 includes an operating section 58 substantially parallel to the pressing plate 510, and a substantially V-shaped connecting section 56 connecting the operating section 58 to the pressing plate 510. The connecting section 56 includes a connecting wall 561 jointed to the pressing plate 510, and a securing wall 563 connecting to the operating section 58. The securing wall 563 is arranged at an obtuse angle relative to the operating section 58. A wedge shaped blocking protrusion 5631 protrudes from the securing wall 56, and another wedge shaped blocking protrusion 581 protrudes from the operating section 58. A securing slot 550 is defined between the higher ends of the wedge shaped blocking protrusions 5631 and 581 located at a joint of the securing wall 563 and the operating section 58. Two blocking bars 59 extend from two side edges of a joint between the pressing portion 51 and the actuating portion 55. The two blocking bars 59 are perpendicular to the pressing plate 510. The actuating portion 55 is formed between the two blocking bars 59.

Figure 4:
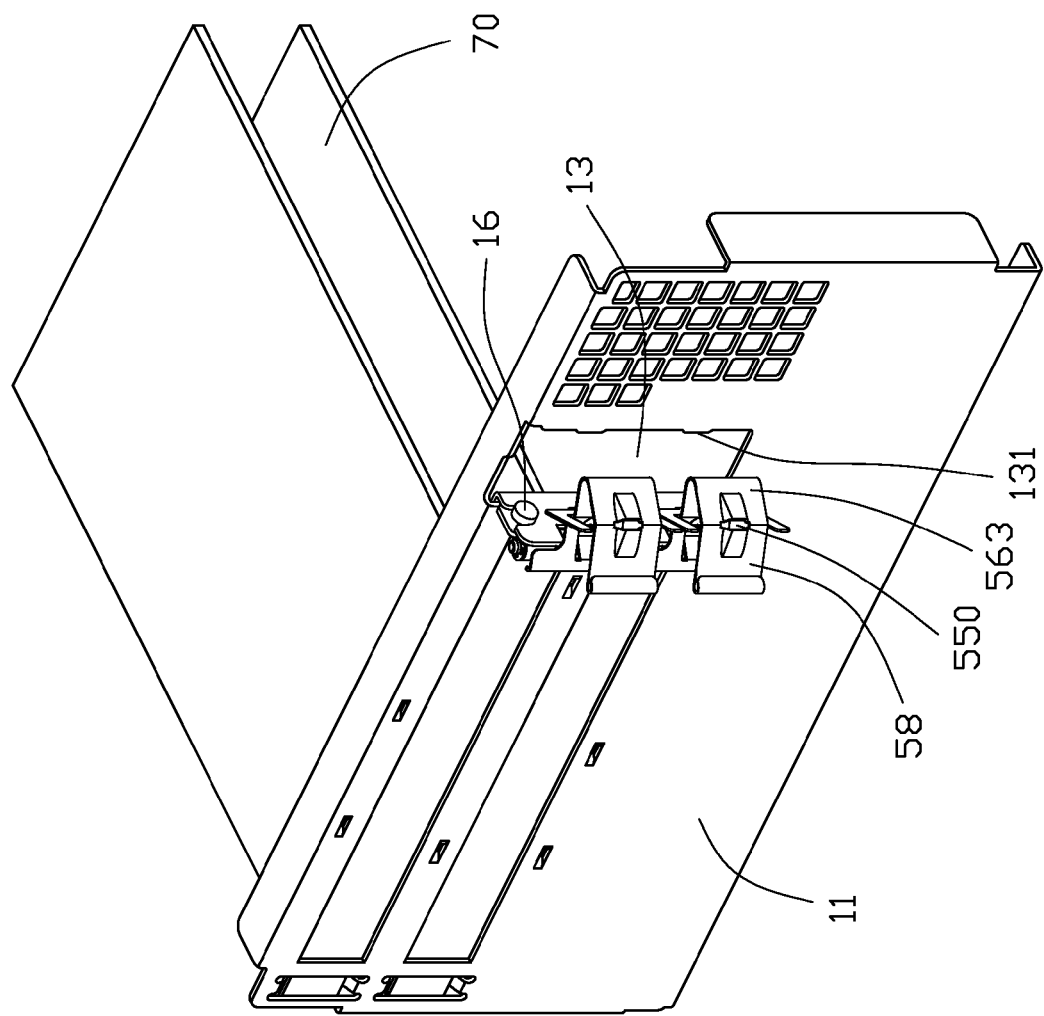
FIG. 4 is an assembled view of FIG. 1, with the elastic securing members being released.
Figure 5:
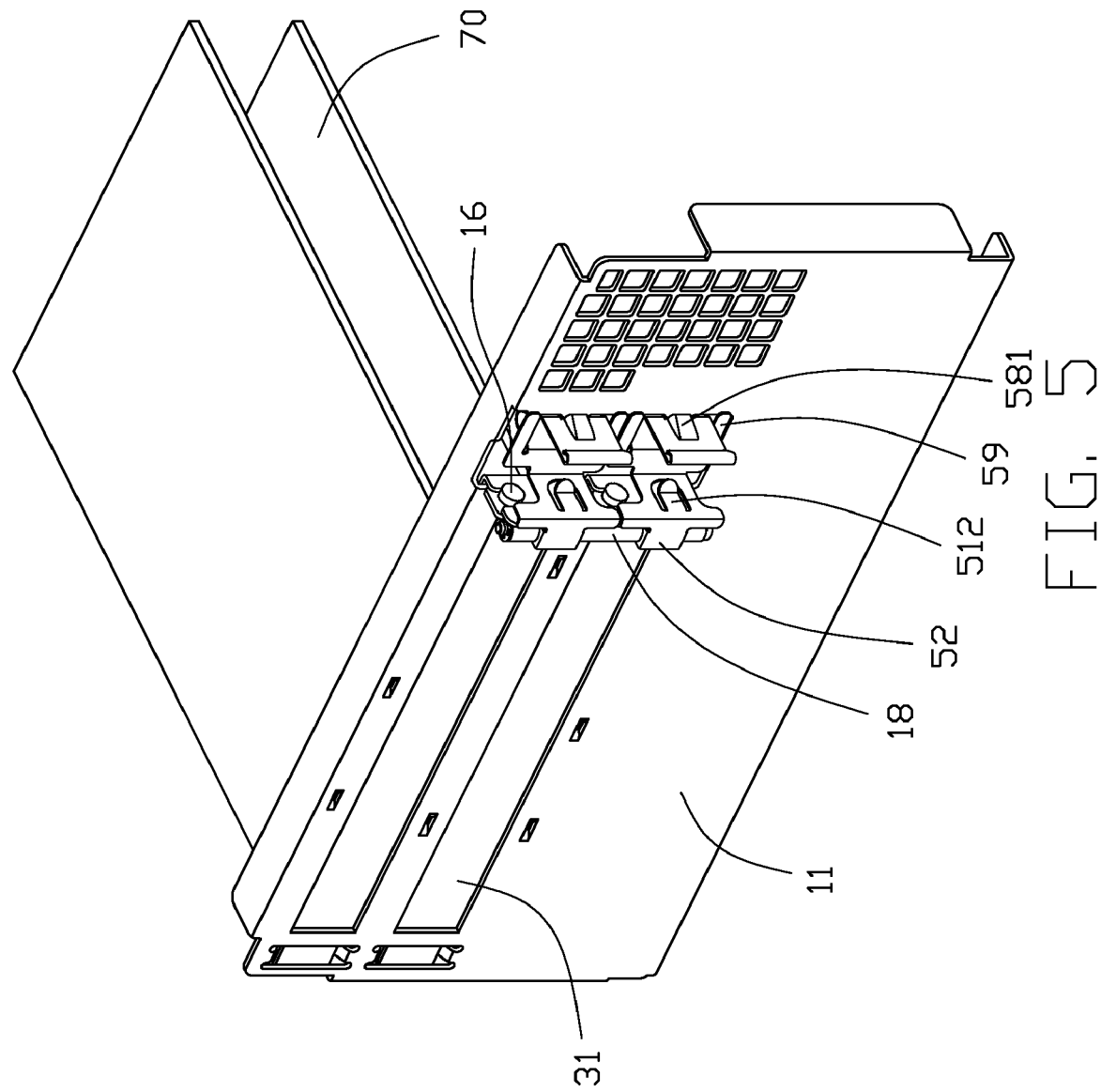
FIG. 5 is an assembled view of FIG. 1, with the elastic securing members engaging with the mounting bracket.
Figure 6:
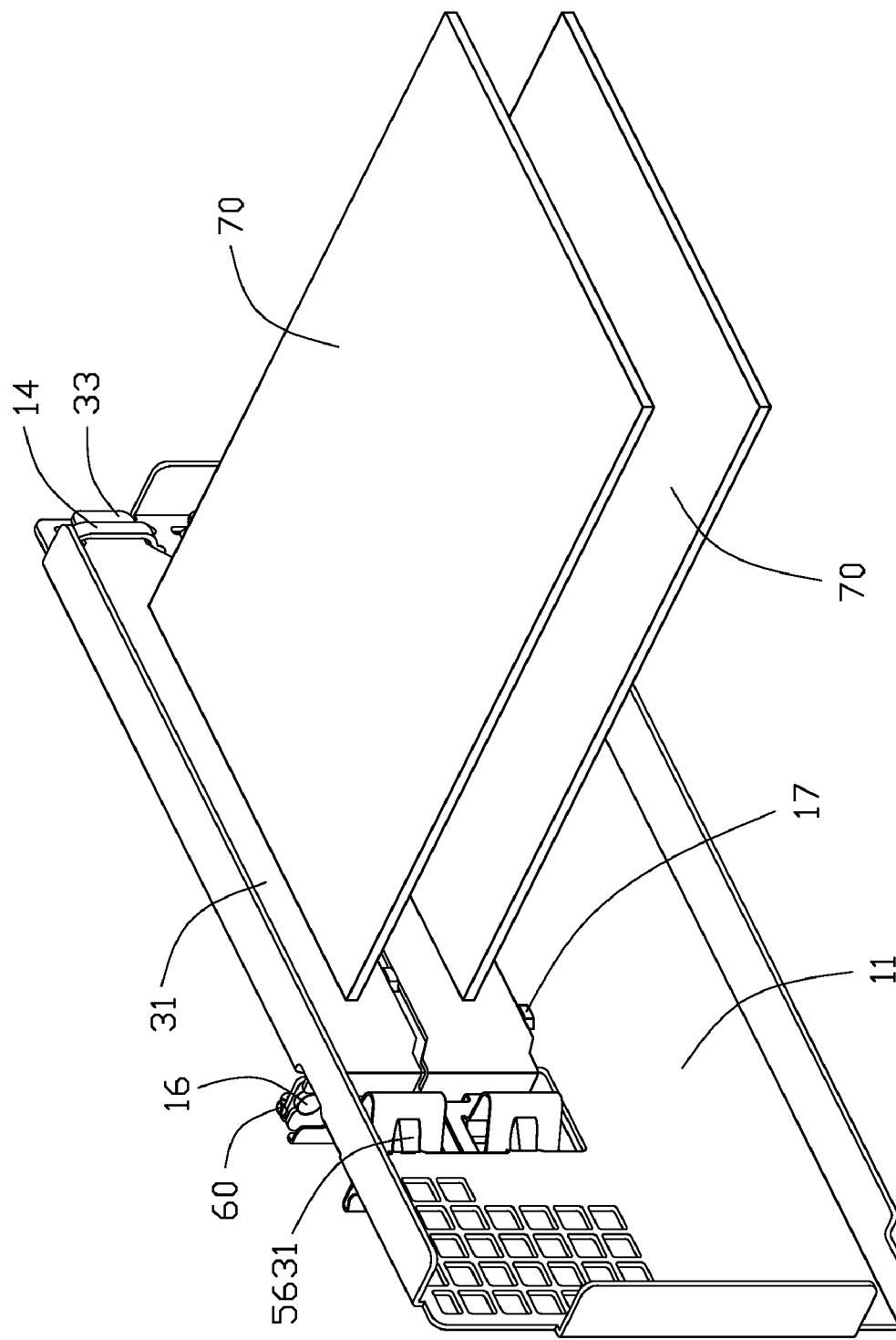
FIG. 6 is similar to FIG. 5, but viewed from another aspect.

Referring to FIGS. 4-6, in assembly, the supporting walls 52 and pivot tabs 53 of the elastic securing members 50 are received in the cutouts 19 of the blocking plate 15. A pivoting fastener 60 is inserted in the pivot portion pivot holes 181 and the pivot holes 531 in the pivot tabs 53 to pivotally attach the elastic securing members 50 to the blocking plate 15. The PCI cards 70 are secured to corresponding securing pieces 30. The securing piece bases 31 cover the corresponding elongated rectangular slots 12. The first ends 33 of the securing pieces 30 are inserted in the securing slots 141. The securing piece second ends 35 abut the blocking plate 15 via the mounting opening 13. The blocking protrusions 16 are received in the cutouts 351. Then, the elastic securing members 50 are pivoted to move close to the mounting bracket base 11 and are received in the mounting opening 13. During reception of the elastic securing members 50 in the mounting opening 13, the wedge shaped blocking protrusions 5631 on the securing walls 563 are biased by the blocking tabs 131 to force the securing walls 563 to move toward the pressing plates 510. When the blocking tabs 131 of the mounting bracket base 11 slide over the wedge shaped blocking protrusions 5631 on the securing walls 563 and engage in the securing slots 550, the elastic securing members 50 are securely mounted on the mounting bracket 10. The pressing plates 510 abut against the securing piece second ends 35. The elastic tabs 512 on the pressing plates 510 are deformed to tightly sandwich the second ends 35 between the blocking plate 15 and the pressing plate 510.

In disassembly, the operating sections 58 of the elastic securing members 50 are pushed to move in a direction substantially perpendicular to the pressing plates 510, and thereby elastically deform the actuating portion 55. The securing walls 563 are caused to move close to the pressing plates 510 and the blocking protrusions 131 disengage from the corresponding securing slots 550. Thus, the elastic members 50 can be pivoted to move away from the mounting bracket base 11, and the pressing plates 510 no longer abut the securing piece second ends 35. The securing pieces 30 and the PCI cards 70 can be easily removed from the mounting bracket 10.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A mounting apparatus for a PCI card, comprising:
a mounting bracket having a base and a blocking plate perpendicular to the base, and an opening defined in the mounting bracket adjacent to the blocking plate;
a securing piece adapted to attach the PCI card to the mounting bracket, the securing piece comprising a first end and a second end perpendicular to the first end, the first end abutting and engaging with the mounting bracket base, and the second end abutting the blocking plate of the mounting bracket; and
an elastic securing member pivotally mounted on the blocking plate; the elastic securing member comprising a pressing portion and an actuating portion connected with the pressing portion, the actuating portion being resiliently received in the opening to sandwich the second end of the securing piece between the blocking plate and the pressing portion.

2. The mounting apparatus for a PCI card of claim 1, wherein a blocking tab protrudes from a side edge of the opening opposite to the blocking plate, the actuating portion of the elastic securing member defines a securing slot, the blocking tab engages in the securing slot to retain the actuating portion in the base opening.

3. The mounting apparatus for a PCI card of claim 2, wherein the actuating portion of the elastic securing member comprises an operating section and a connecting section formed between the operating section and the pressing portion, the operating section is substantially parallel to the pressing portion.

4. The mounting apparatus for a PCI card of claim 3, wherein the connecting section is substantially V-shaped, the connecting section comprises a securing wall arranged at an obtuse angle relative to the operating section, and the securing slot is defined at a joint of the securing wall and the operating section.

5. The mounting apparatus for a PCI card of claim 4, wherein a first blocking protrusion is formed on the operating section, a second blocking protrusion is formed on the securing wall of the connecting section, and the securing slot is defined between the first blocking protrusion and the second blocking protrusion.

6. The mounting apparatus for a PCI card of claim 5, wherein the first blocking protrusion and the second blocking protrusion are wedge-shaped with thicker ends, the securing slot is defined between the thicker ends of the first blocking protrusion and the second blocking protrusion.

7. The mounting apparatus for a PCI card of claim 6, wherein two blocking bars extend from the elastic securing member, the two blocking bars abut the mounting bracket base, and the actuating portion is disposed between the two blocking bars.

8. The mounting apparatus for a PCI card of claim 1, wherein the pressing portion of the elastic securing member forms an elastic tab, the second end of the securing piece is sandwiched between the elastic tab and the mounting bracket blocking plate.

9. The mounting apparatus for a PCI card of claim 1, wherein the elastic securing member comprises two pivot tabs perpendicularly extending from the pressing portion, each pivot tab defines a pivot hole; two pivot portions are located at a side of the blocking plate; and a pivoting member is located through the pivot holes in the pivot tabs and the pivot portions of the blocking plate to pivotally attach the elastic securing member to the mounting bracket blocking plate.

10. A mounting apparatus for a PCI card, comprising:
a mounting bracket having a base and a blocking plate perpendicular to the base,
a securing piece adapted to secure the PCI card to the mounting bracket, the securing piece comprising a first end abutting and engaging with the mounting bracket base, and a second end abutting the blocking plate of the mounting bracket; and
an elastic securing member pivotally mounted on the blocking plate of the mounting bracket, the elastic securing member comprising a pressing portion and an actuating portion, the actuating portion resiliently engages the mounting bracket to force the pressing portion to abut against the second end of the securing piece; wherein the actuating portion is capable of being moved in a direction perpendicular to the pressing portion to disengage from the mounting bracket, so as to pivot the elastic securing member to release the securing piece.

11. The mounting apparatus for a PCI card of claim 10, wherein a blocking tab protrudes from a side edge of the opening opposite to the blocking plate, the actuating portion of the elastic securing member defines a securing slot, the blocking tab engages the securing slot to secure the actuating portion in the base opening.

12. The mounting apparatus for a PCI card of claim 11, wherein the actuating portion comprises an operating section and a connecting section formed between the operating section and the pressing portion of the elastic securing member, the operating section is substantially parallel to the pressing portion.

13. The mounting apparatus for a PCI card of claim 12, wherein the connecting section is substantially V-shaped, the connecting section comprises a securing wall arranged at an obtuse angle relative to the operating section, and the securing slot is defined at a joint of the securing wall and the operating section.

14. The mounting apparatus for a PCI card of claim 13, wherein a first blocking protrusion is formed on the operating section, a second blocking protrusion is formed on the securing wall, and the securing slot is defined between the first blocking protrusion and the second blocking protrusion.

15. The mounting apparatus for a PCI card of claim 14, wherein the first blocking protrusion and the second blocking protrusion are wedge-shaped with thicker ends, the securing slot is defined between the thicker ends of the first blocking protrusion and the second blocking protrusion.

16. The mounting apparatus for a PCI card of claim 15, wherein two blocking bars extend from the elastic securing member, the two blocking bars abut the mounting bracket base, and the actuating portion is disposed between the two blocking bars.

17. The mounting apparatus for a PCI card of claim 10, wherein the pressing portion of the elastic securing member forms an elastic tab, the second end of the securing piece is sandwiched between the elastic tab and the mounting bracket blocking plate.

18. The mounting apparatus for a PCI card of claim 10, wherein the elastic securing member comprises two pivot tabs perpendicularly extending from the pressing portion, each pivot tab defining a pivot hole; two pivoted portions are located at a side of the blocking plate; and a pivoting member is located through the pivot holes in the pivot tabs and the pivoted portions of the blocking plate to pivotally attach the elastic securing member to the mounting bracket blocking plate.

* * * * *